(No Model.) 4 Sheets—Sheet 1.

G. H. ELLIS.
STOP MOTION AND TESTING MECHANISM FOR TWINE MACHINES.

No. 567,127. Patented Sept. 8, 1896.

Witnesses
Arthur Johnson
R. Roy Truman

Inventor.
George H. Ellis (No Model.) 4 Sheets—Sheet 2.

G. H. ELLIS.
STOP MOTION AND TESTING MECHANISM FOR TWINE MACHINES.

No. 567,127. Patented Sept. 8, 1896.

Witnesses
Arthur Johnson
R. Roy Truman

Inventor
George H. Ellis (No Model.) 4 Sheets—Sheet 3.
G. H. ELLIS.
STOP MOTION AND TESTING MECHANISM FOR TWINE MACHINES.
No. 567,127. Patented Sept. 8, 1896.
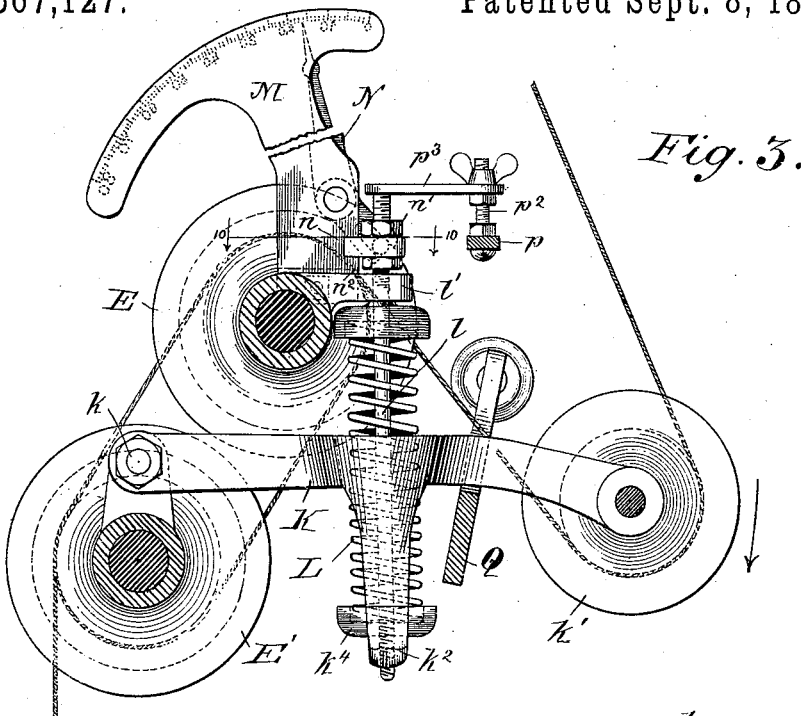
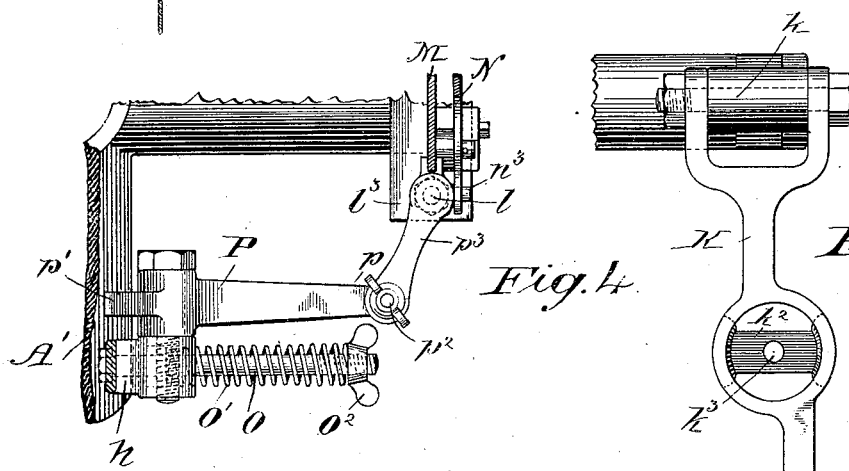
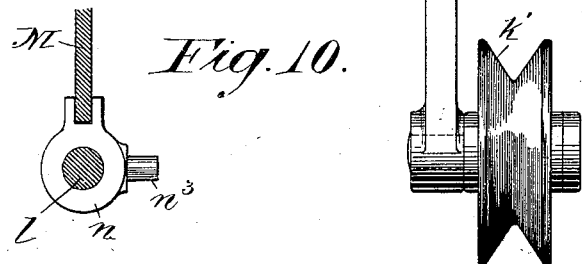
Witnesses
Arthur Johnson
Inventor
George H. Ellis

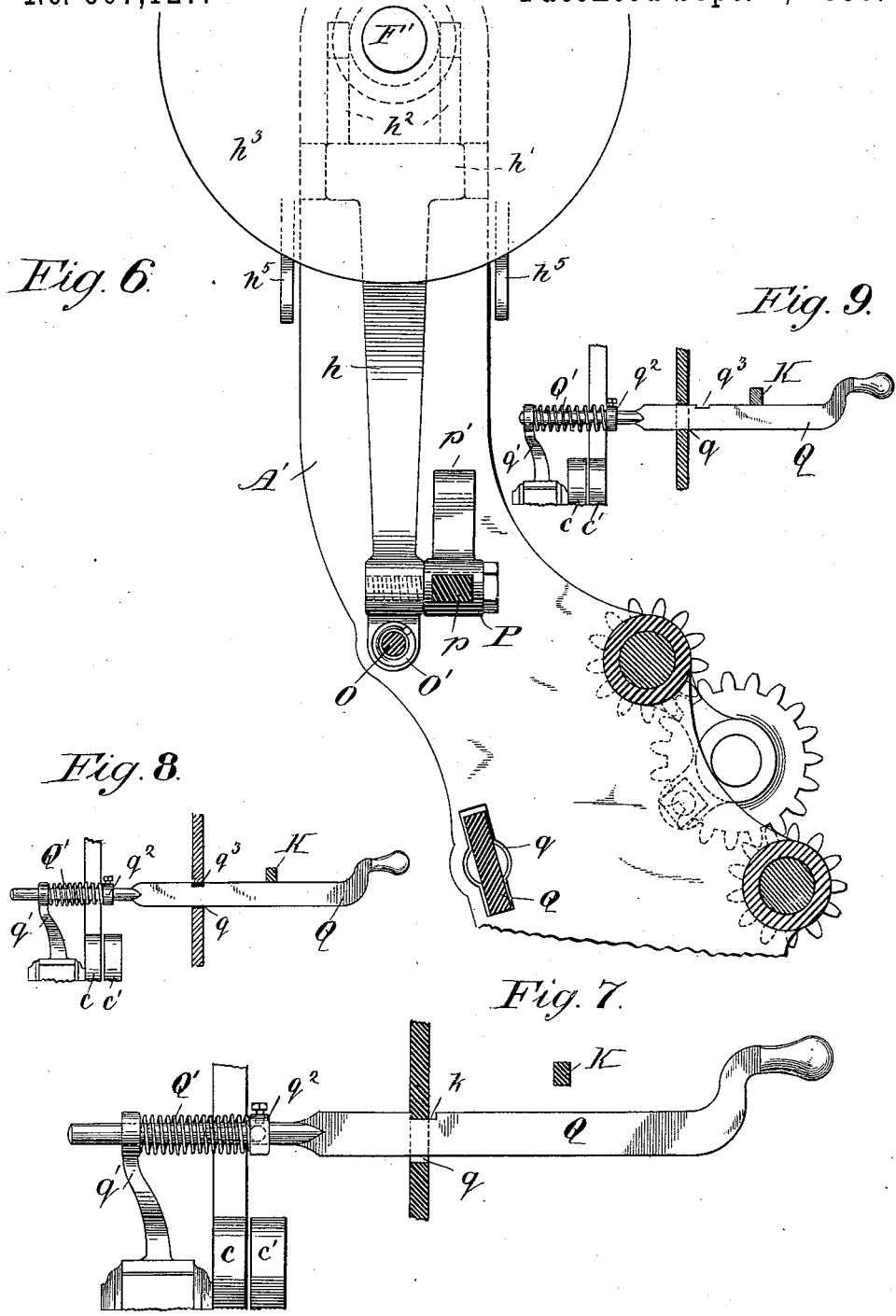

UNITED STATES PATENT OFFICE.

GEORGE H. ELLIS, OF CHICAGO, ILLINOIS, ASSIGNOR TO THE DEERING HARVESTER COMPANY, OF SAME PLACE.

STOP-MOTION AND TESTING MECHANISM FOR TWINE-MACHINES.

SPECIFICATION forming part of Letters Patent No. 567,127, dated September 8, 1896.

Application filed January 24, 1895. Serial No. 536,023. (No model.)

*To all whom it may concern:*

Be it known that I, GEORGE H. ELLIS, of Chicago, Illinois, have invented certain new and useful Improvements in Stop-Motions and Testing Mechanism for Twine-Machines, of which the following is a full specification, reference being had to the accompanying drawings, in which—

Figure 1:
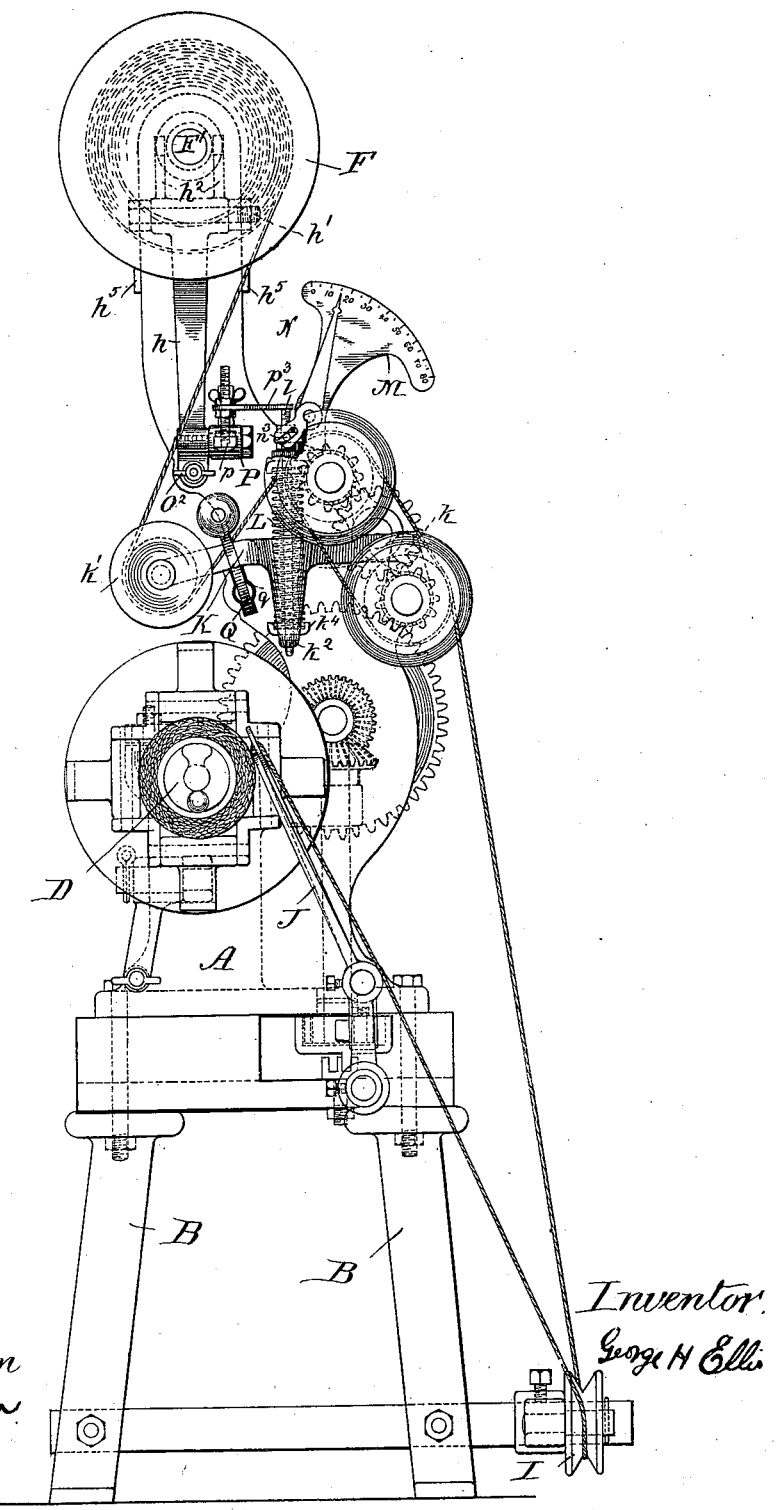
Figure 2:
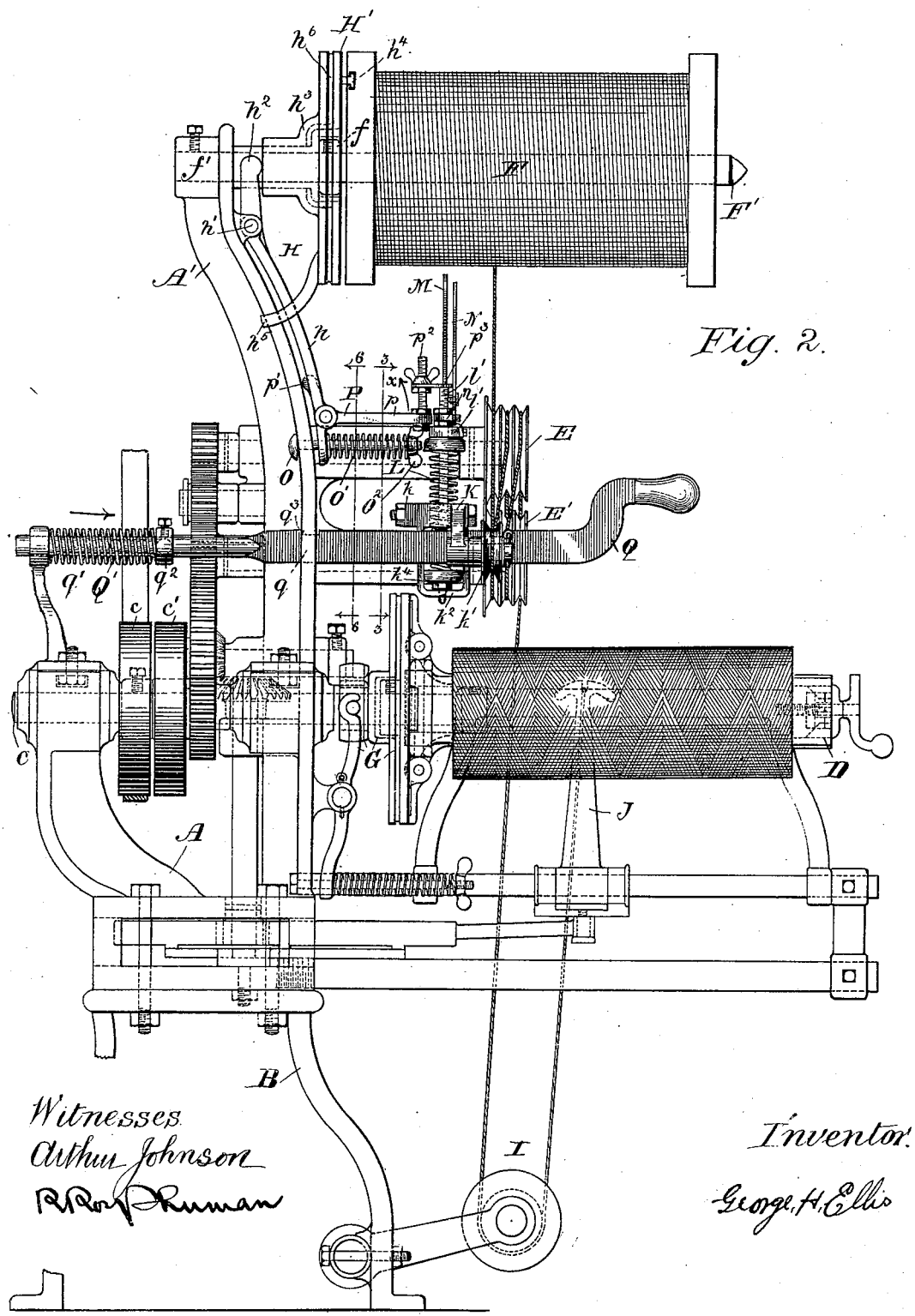

Figure 1 is a front elevation of a machine to which an exemplification of my invention is applied. Fig. 2 is a side elevation. Fig. 3 is a section on line 3 3 of Fig. 2. Figs. 4 and 5 are details. Fig. 6 is a sectional elevation on the line 6 6 of Fig. 2. Figs. 7, 8, and 9 are details of the belt-shifting mechanism. Fig. 10 is a sectional detail on the line 10 10 of Fig. 3.

The object of my invention is to provide means whereby the strength of the twine being spun or wound is tested, and to provide means whereby the machine is stopped automatically when the twine being tested breaks. It consists in various devices, hereinafter described, for accomplishing the above-mentioned purposes.

As shown in the drawings, my invention is applied to a machine previously invented, shown, described, and claimed in a recent application filed January 12, 1895, Serial No. 534,686, by John F. Steward and George H. Ellis, but it will be understood that my devices can be applied to various kinds of machines in modified form without departing from the principles involved therein.

It is unnecessary to describe fully the twine-machine shown in the drawings, as reference can be had to the aforesaid application, it being sufficient for the present purposes to describe the machine but in general terms.

A is the framework upon suitable supports B.

C is a shaft suitably journaled in bearings and having fast and loose pulleys $c$ and $c'$ mounted thereon at one end and at the other a mandrel D, upon which the ball is formed.

E and E' are haulers suitably driven from the shaft C by gearing, and serve to haul the twine from a spool F, rotatably supported upon the stud F', which stud is secured to the arm A' of the frame.

G is the friction device, applied to the mandrel D in such a way that the said mandrel shall have a variable speed.

H is another frictional pad, the purpose of which is to provide tension to the twine as it is being unwound from the spool F.

The operation of the machine is in general terms as follows: The spool of twine F as received from the spinners is placed upon the stud F' and connected with the frictional device H by a button $h^4$, the full purpose of which frictional device will be hereinafter explained. The twine is passed around the haulers E and E' down to the pulley I, thence to the traversing twine-guide J, thence to the mandrel D, upon which it is wound. So far as described the machine is identical with that shown in the aforesaid application.

Coming now to the preferred exemplification of the invention which forms the subject-matter of this application, K is a lever or arm pivoted at a convenient point $k$ on the main frame, and having, preferably at its opposite end, a sheave $k'$, around which the twine is carried from the spool F to the haulers E and E'. Consequent to the stress upon the twine caused by the haulers unwinding it from the spool it will be seen that if there were no resistant the lever K would be turned upon its fulcrum until the twine assumed a straight line between the spool and the haulers. A resistant to this movement is found in the spring L, which spring is preferably situated between a lug $l'$ on the frame and the lever K, and held in place in the following manner: $l$ is a bolt passing through the lug $l'$ down to the stirrup $k^2$ of the lever K, having its lower end resting in the hole $k^3$ of the said stirrup. The nut $k^4$ forms a limit to the passing of the bolt through the said hole at its lower end. This nut has a concave portion in which the lower end of the spring L rests. A washer having a similar concave is supported upon the bolt $l$ below the lug $l'$. Between the two concaved pieces rests the spring L, which exerts a constant pressure upon the lever K in the direction of the arrow in Fig. 3. Secured to the lug $l'$ is a graduated dial M, and pivoted conveniently thereto is an indicating-finger N. The dial M is shown as graduated to indicate the stress upon the twine in pounds. The indicating-finger is extended downward. Upon the bolt $l$ and above the lug $l'$ is a collar $n$, which collar is adjustably held in place upon the said bolt, preferably by lock-nuts $n'$ and $n^2$. Projecting from this collar is the pin $n^3$, which pin is engaged by the end of the indicating-finger N. It will be seen that the tension put upon the twine will compress the spring L until the tension of the said spring equals that of the twine, such action resulting in the movement of the bolt $l$ carrying the pin $n^2$ vertically, and the said pin engaging the indicating-finger N as it does the stress put upon the twine will be indicated upon the dial.

Turning to Fig. 2 to describe the friction device H, $h$ is a lever having a fulcrum $h'$ on the arm A' of the frame. Its upper end $h^2$ is forked and adapted to engage a non-rotatable flanged collar $h^3$. H' is a disk loosely supported upon the shaft F' and held from lateral movement by the collar $f$ and the bearing $f'$. As before mentioned, the button $h^4$ is as one part with this flange and forms means by which the spool F is secured thereto. The collar $h^3$ is loosely mounted upon the hub of the said disk and is prevented from rotating preferably by arms $h^5$. $h^6$ is a pad of leather or other suitable friction-producing material placed between the disks $h^3$ and H', and any pressure exerted by the lever $h$ upon the part $h^3$ will force it toward the disk H' and create a frictional resistant to the turning of the spool caused by the unwinding therefrom of the twine by the haulers. At the lower end of the lever $h$, and passing through a convenient aperture in the frame, is a bolt O, upon which is a spring O' and a wing-nut O², so attached as to produce pressure upon the friction devices above mentioned, the wing-nut being for the purpose of adjusting the tension of the spring. Pivoted upon the lower end of the lever H is a second lever P, having one member, $p$, extending forward toward the bolt $l$ and the other end, $p'$, extending upward and resting upon the arm A' of the frame. It will be seen that when pressure is exerted upon the lever P in the direction of the arrow X on Fig. 2 the part $p'$ will be the fulcrum by which the said lever P will carry the lower end of the lever $h$ away from the frame A' and the tension of the friction device H will be decreased. In order that this pressure may be varied automatically, I connect it with the lever or arm K in the following manner: $p^2$ is a bolt passing through the end of the member $p$ of the lever P and extending vertically above it, being secured thereto by a lock-nut or other suitable means. Attached to its upper end adjustably, by any convenient means, is an extension $p^3$, the outer extremity of which rests upon the upper end of the bolt $l$. This extension-piece may be considered simply as part of the member $p$ of the lever P and as a convenient means for making the extremity of the said member adjustable in height. As the tension upon the twine increases the bolt $l$ will be raised vertically, and, engaging the extension piece $p^3$, will serve to reduce the pressure of the friction devices H upon the spool F and thus automatically serve to equalize the strain put upon the twine. It will be understood that the various means for providing adjustments are for the purpose of producing a predetermined stress upon the twine as it is being unwound from the spool, which is constantly decreasing in diameter, that stress being indicated by the finger N upon the dial M.

Q is a stop-lever supported in the frame at $q$ and at $q'$ and having a shipping-fork secured thereto, which engages the driving-belt, which shipping-fork may be of any of the well-known kinds, as, for instance, that shown in the companion application referred to above.

Q' is a spring situated between the hub $q^2$ of the shipping-fork and the support $q'$.

$q^3$ is a notch on the upper edge of the lever and adapted to engage the upper end of the slot $q'$. When it is desired to stop the machine by hand, pressure is brought to bear upon the lever downwardly until the notch $q^3$ is disengaged from the slot in the frame, when the spring Q' will force the shipping-lever in the direction of the arrow in Fig. 2 and thus throw the belt upon the loose pulley. In order to provide means for automatically stopping the machine when the twine breaks, I preferably construct the lever or arm K so that it extends across the stop-lever Q, and so place the last-mentioned lever that when the twine breaks the pressure of the spring L will force the outer end of the lever K, aided by its own weight, downward against the lever Q, forcing its notch out of engagement with the slot in the frame, thereby allowing the spring Q², as before described, to throw the stop-lever endwise, thus guiding the driving-belt onto the loose pulley. As the tension of the spring L is considerable, the arm which it sustains will be forced quickly downward and a sharp blow be given to the disconnecting devices and the machine stopped promptly. The nut $k^4$ forms a stop upon the bolt $l$, whereby the arm K is not influenced by the spring L after the shipping-lever Q has been released, and there is no stress upon the said lever Q to prevent its spring from forcing it endwise except the weight of the said arm alone.

In the above description, which is, as before said, of my invention as most preferably carried out, I have considered the part K as a lever having at its end an antifriction-roller around which the twine operated upon is drawn. It will be seen, further, that this part K could be considered as an arm having one end suspended upon the twine being operated upon, and it will be further seen that the sheave $k'$ could be considered as an elastically-held sheave suspended upon the twine being tested. It will be also understood that a construction within the principles of my invention might be made with the part K of sufficient weight to make it operative, thereby dispensing with the spring, and I shall draw my claims in reference to the above.

I shall claim as an element in some of the claims a friction device, and it will be understood that any such device, adapted to have mounted thereon a lever operating substantially as the lever P does, can be used.

What I claim as my invention, and desire to secure by Letters Patent, is—

1. The combination of an arm suspended at one end upon the twine being operated upon, a spring acting in opposition to the tension of said twine, a tension device applying tension to the said twine, adjustable connecting mechanism between the said arm and the said tension device whereby a predetermined amount of tension is maintained upon the twine, and indicating mechanism connected to the said arm whereby the said maintained amount of tension is indicated, substantially as described.

2. The combination of a lever supported at one end upon the twine being operated upon, a bolt connected to said lever, a spring acting upon the said lever in opposition to the tension of the said twine, a dial and an indicating-finger connected to said bolt, substantially as described.

3. The combination of a lever having an antifriction-roller supported upon its end, around which the twine to be tested is drawn, a bolt connected to the said lever, a spring acting upon the said lever in opposition to the tension of the said twine, a dial and an indicating-finger connected to the said bolt, substantially as described.

4. The combination of a tension device, a lever carrying at its end a roller over which the twine to be tested is drawn, a spring acting in opposition to the tension of the said twine, a bolt moved by said lever, a graduated dial, an indicating-finger and the adjustable connecting mechanism between the said finger and the said bolt whereby the adjustment of the said connection serves to influence both the indicating-finger and the tension of the said spring, substantially as described.

5. The combination with the driving mechanism and arresting devices therefor having a stop-lever of a spring-held arm pivoted upon the frame and suspended upon the twine being operated upon, and over the said lever whereby the said arm is adapted to release the said arresting devices and stop the machine when the twine breaks, substantially as described.

6. The combination of the driving mechanism and arresting devices therefor with a twine-testing device having an arm around which the twine being wound is drawn, said arm adapted to operate said arresting devices when the said twine breaks, a spring to hold said arm, a tension device also connected to said spring, means for adjusting the tension of the spring, the said spring being adapted to impart a portion of its stress to said tension device and a tension-indicator connected to said tension device, substantially as described.

7. The combination with the spool and haulers of a twine-machine of a lever of a friction device adapted to apply tension to the twine as it is being unwound from the spool, an elastically-held arm suspended upon the twine being operated upon and an intermediate lever pivoted upon said friction-lever and adjustably connected with the said elastically-held arm whereby the twine is given a definite tension throughout the entire unwinding of the spool, substantially as described.

8. The combination with the spool and haulers of a twine-machine, of a lever of a friction device adapted to apply tension to the twine as it is being unwound from the spool, an elastically-held arm suspended upon the twine being operated upon and an intermediate lever pivoted upon the said friction-lever and connected with the said elastically-held arm whereby the twine is given a definite tension throughout the entire unwinding of the spool, substantially as described.

GEORGE H. ELLIS.

Witnesses:
ARTHUR JOHNSON,
R. ROY SHUMAN.